United States Patent
Jung et al.

(10) Patent No.: US 12,370,532 B2
(45) Date of Patent: Jul. 29, 2025

(54) METHOD OF MANUFACTURING METAL OXIDE GAS SENSOR FUNCTIONALIZED BY MULTICOMPONENT ALLOY NANOPARTICLE-PEROVSKITE COMPOSITE CATALYST

(71) Applicant: KOREA ADVANCED INSTITUTE OF SCIENCE AND TECHNOLOGY, Daejeon (KR)

(72) Inventors: WooChul Jung, Daejeon (KR); Il-Doo Kim, Daejeon (KR); Jun Kyu Kim, Daejeon (KR); Dong-Ha Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 825 days.

(21) Appl. No.: 17/533,240

(22) Filed: Nov. 23, 2021

(65) Prior Publication Data
US 2022/0370990 A1 Nov. 24, 2022

(30) Foreign Application Priority Data
May 7, 2021 (KR) .......................... 10-2021-0059359

(51) Int. Cl.
 *B01J 23/83* (2006.01)
 *B01J 23/14* (2006.01)
 (Continued)

(52) U.S. Cl.
 CPC .............. *B01J 23/83* (2013.01); *B01J 23/14* (2013.01); *B01J 35/23* (2024.01); *B01J 35/58* (2024.01);
 (Continued)

(58) Field of Classification Search
 CPC ........ B01J 23/83; B01J 23/14; B01J 35/0013; B01J 35/06; B01J 37/04; B01J 37/088;
 (Continued)

(56) References Cited

U.S. PATENT DOCUMENTS

2021/0188656 A1* 6/2021 Jung .................... C01G 23/003
2022/0395812 A1* 12/2022 Sheludko ............... B01J 23/002

FOREIGN PATENT DOCUMENTS

CN 103657731 A * 3/2014 ............. B01J 31/28
CN 111621807 A * 9/2020 ........... C01G 53/006
(Continued)

OTHER PUBLICATIONS

Subio Liu et al., "Highly Stable and Efficient Catalyst with In Situ Exsolved Fe—Ni Alloy Nanospheres Socketed on an Oxygen Deficient Perovskite for Direct CO2 Electrolysis." ACS Catalysis, vol. 6, pp. 6219-6228. (Year: 2016).*
(Continued)

*Primary Examiner* — Patricia L. Hailey
(74) *Attorney, Agent, or Firm* — LEX IP MEISTER, PLLC

(57) ABSTRACT

Provided are a composite structure, in which metal nanoparticle-perovskite oxide is bound to metal oxide supports (i.e., sensing materials), and a preparation method thereof. The composite structure has improved durability, in which metal nanoparticles uniform in size are evenly distributed on the surface of perovskite oxide. Provided is also a high-performance gas sensor having excellent target gas detection performances by including the composite structure.

3 Claims, 13 Drawing Sheets

(51) Int. Cl.

| | |
|---|---|
| *B01J 35/23* | (2024.01) |
| *B01J 35/58* | (2024.01) |
| *B01J 37/04* | (2006.01) |
| *B01J 37/08* | (2006.01) |
| *B01J 37/18* | (2006.01) |
| *B01J 37/34* | (2006.01) |
| *G01N 31/10* | (2006.01) |

(52) U.S. Cl.
CPC .............. *B01J 37/04* (2013.01); *B01J 37/088* (2013.01); *B01J 37/18* (2013.01); *B01J 37/342* (2013.01); *G01N 31/10* (2013.01)

(58) Field of Classification Search
CPC ........ B01J 37/18; B01J 37/342; B01J 23/002; G01N 31/10
USPC ................... 502/5, 525, 303, 330, 331, 338
See application file for complete search history.

(56) References Cited

FOREIGN PATENT DOCUMENTS

| | | | | |
|---|---|---|---|---|
| KR | 10-2019-0074378 | | 6/2019 | |
| KR | 20190074378 A | * | 6/2019 | ............. C01G 23/00 |
| KR | 20210155311 A | * | 12/2021 | ............. B01J 23/755 |
| WO | WO-2018007826 A1 | * | 1/2018 | .......... H01M 4/8615 |
| WO | 2019048840 | | 3/2019 | |

OTHER PUBLICATIONS

Xinyang Meng et al., "In-situ exsolution of nanoparticles from Ni substituted Sr2Fe1.5Mo0.5O6 perovskite oxides with different doping contents." Electrochimica Acta 348, pp. 1-12. (Year: 2020).*

Rui Huang et al., "Exsolved metal-boosted active perovskite oxide catalyst for stable water gas shift reaction." Journal of Catalysis 400, pp. 148-159. (Year: 2021).*

Li, X. et al., "Enhancing NH3 sensing performance of mixed potential type sensors by chemical exsolution of Ag nanoparticle on AgNbO3 sensing electrode", Sensors & Actuators:B. Chemical 2019, 298, 126854, Nov. 1, 2019; Its Abstract.

Chen, D. et al., "One-pot electrospinning and gas-sensing properties of LaMnO3 perovskite/SnO2 heterojunction nanofibers", J Nanopart Res (2018) 20: 65, Mar. 6, 2018; Its Abstract.

Kong, L. et al., "Gas-sensing property and mechanism of CaxLa1—xFeO3 ceramics", Sensors and Actuators B: Chemical, 30 (1996), pp. 217-221, Jan. 31, 1996 ; Its Abstract.

HSu, K. et al., "Highly response CO2 gas sensor based on Au—La2O3 doped SnO2 nanofibers", Materials Letters, 261 (2020) 127144, Feb. 15, 2020 ; Its Abstract.

Chen, S. et al., "Regenerable and durable catalyst for hydrogen production from ethanol steam reforming", International Journal of Hydrogen Energy, vol. 36, Issue 10, pp. 5849-5856, May 2011 ; Its Abstract.

Jang, J. et al., "Dopant-Driven Positive Reinforcement in Ex-Solution Process: New Strategy to Develop Highly Capable and Durable Catalytic Materials", Adv. Mater. 2020. 32. 2003983, Oct. 1, 2020; Its Abstract.

KIPO, Office Action of the corresponding Korean Patent Application No. 10-2021-0059359 dated Jan. 16, 2023.

Li, Xu, et al. "Enhancing NH3 sensing performance of mixed potential type sensors by chemical exsolution of Ag nanoparticle on AgNbO3 sensing electrode." Sensors and Actuators B: Chemical 298 (available online Jul. 23, 2019): 126854.pp. 1-10.

Ji-Soo Jang et al., "Dopant-Driven Positive Reinforcement in Ex-Solution Process: New Strategy to Develop Highly Capable and Durable Catalytic Materials", Adv. Mater. 2020, 32, 2003983, Oct. 1, 2020.

* cited by examiner

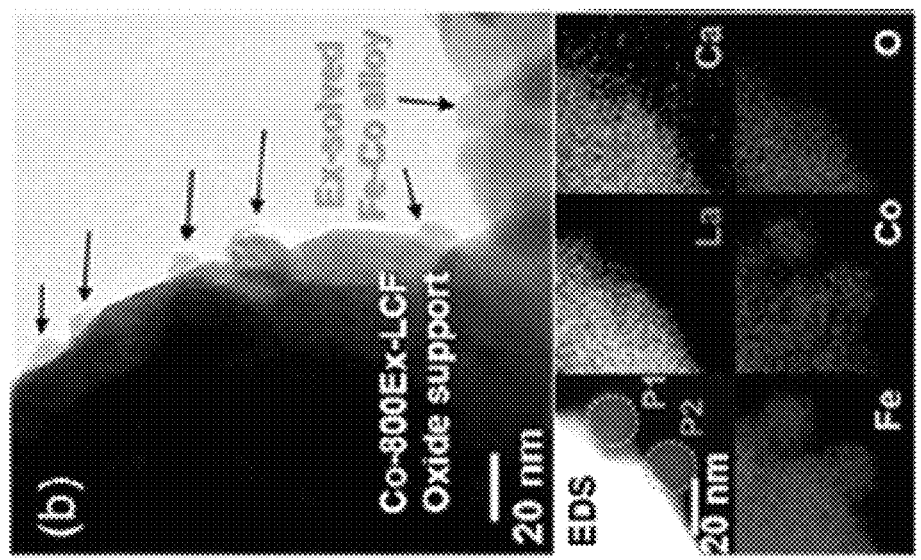

METHOD OF MANUFACTURING METAL OXIDE GAS SENSOR FUNCTIONALIZED BY MULTICOMPONENT ALLOY NANOPARTICLE-PEROVSKITE COMPOSITE CATALYST

TECHNICAL FIELD

The present invention relates to a composite structure including multicomponent alloy nanoparticle-perovskite and a preparation method thereof, and a gas sensor including the composite structure as a catalyst.

BACKGROUND ART

A metal nanoparticle-metal oxide support type gas sensing layer manufactured by decorating a metal species with excellent catalytic activity in the form of nanoparticles onto metal oxide supports has excellent gas sensitivity and selectivity, and is receiving attention because it is employed to detecting environmental toxic gases or biomarker gases in exhaled breath.

Generally, the metal nanoparticle catalysts used in this structure, precious group metals such as Pt, Ir, etc., are mainly used due to their outstanding catalytic activity. However, owing to their high price, cost competitiveness is quite low, and there is also a difficulty in a process of uniformly dispersing nano-sized particles to the surface of metal oxide supports. Until now, the gas sensor structures have been generally produced by mixing metal nanoparticles with metal oxide supports and/or depositing the metal nanoparticles thereto by a physical method such as physical mixing, physical vapor deposition, chemical vapor deposition, impregnation, etc. However, when the structures are produced by these processes, detachment of the metal nanoparticles from the oxide supports as well as aggregation between metal nanoparticles occur during the fabrication process or gas sensor operation due to a weak binding between the oxide supports and the metal nanoparticles. Consequently, these lead to the performance degradation in gas sensing.

With regards to this, recently, a few attempts have been conducted for utilizing relatively inexpensive perovskite oxide materials which promote catalytic activity, instead of precious metal in the field of gas sensors. Despites of extensive efforts of researchers, the insufficient catalytic activity of pure perovskite oxide catalysts compare to that of precious metal catalysts becomes a stumbling block for improved gas detecting performance. Therefore, it is note that investigating perovskite oxide catalysts which exhibits the catalytic activity similar to that of precious metal catalysts is utmost importance.

DISCLOSURE

Technical Problem

There is provided a composite structure, in which metal nanoparticle-perovskite oxide is functionalized to metal oxide supports, and a preparation method thereof.

There is also provided a gas sensor having improved durability and target gas detection performances by including the composite structure as a catalyst.

Technical Solution

There is provided a composite structure, in which metal nanoparticle-perovskite oxide is functionalized to metal oxide supports.

Further, there is also provided a method of preparing the composite structure, the method including a step (step 1) of mixing a metal nanoparticle precursor with perovskite oxide; a step (step 2) of preparing a solid solution by annealing the mixture of the step 1; a step (step 3) of obtaining metal nanoparticle-perovskite oxide by heat-treating the solid solution of the step 2 in a reducing atmosphere; and a step (step 4) of obtaining the composite structure in which metal nanoparticle-perovskite oxide is bound to the metal oxide supports by performing electrospinning and oxidative heat treatment of a mixture of the metal nanoparticle-perovskite oxide of the step 3 and a precursor of the metal oxide support.

There is also provided a gas sensor including the composite structure, in which metal nanoparticle-perovskite oxide is bound.

In the present invention, the terms "the first", "the second", and the like are used to describe a variety of components, and these terms are merely employed to differentiate one component from other components.

Further, the terms used in this description are just for explaining exemplary embodiments, and are not intended to restrict the present invention.

The singular expression may include the plural expression unless it is differently expressed contextually.

It must be understood that the term "include", "equip", or "have" in the present description is only used for designating characteristics taken effect, numbers, steps, components, or combinations thereof, and do not exclude the existence or the possibility of addition of one or more different characteristics, numbers, steps, components, or combinations thereof beforehand.

In the present specification, when a layer or an element is mentioned to be formed "on" or "above" layers or elements, it means that each layer or element is directly formed on the layers or elements, or other layers or elements may be formed between the layers, subjects, or substrates.

The present invention may be variously modified and have various forms, and specific exemplary embodiments will be illustrated and described in detail below. However, it is not intended to limit the present invention to the specific exemplary embodiments and it must be understood that the present invention includes every modifications, equivalents, or replacements included in the spirit and technical scope of the present invention.

As used herein, the term "composite structure" refers to a single structure, in which metal nanoparticle-perovskite oxide is bound to a metal oxide support.

Further, the term "metal nanoparticle-perovskite oxide" refers to a form in which metal nanoparticles are ex-solved on the surface of perovskite oxide.

Perovskite-oxide-type catalysts can engage the 90% of the elements in the periodic table as their lattice components, leading to various intrinsic catalytic activity. Moreover, an "ex-solution" phenomenon that spontaneously forms heterogeneous metal particles (transition metal-based) on the surface of perovskite oxide through a reductive heat treatment process can be readily applied to this crystal structure. Therefore, the ex-solution phenomenon is applied to develop a composite catalyst, in which non-precious metal catalyst particles are strongly bound to perovskite oxide supports, and it is intended to functionalize a metal oxide-based sensing material with the composite catalyst.

Accordingly, the present invention provides a composite structure, in which metal nanoparticle-perovskite oxide is bound to metal oxide support (i.e., sensing material) by uniformly distributing a single or two or more of metal nanoparticles on the surface of perovskite oxide supports through a reductive heat treatment process followed by subsequent electrospinning process with heat treatment in air atmosphere.

Hereinafter, the present invention will be described in detail.

First, the present invention relates to a method of preparing the composite structure, the method including a step (step 1) of mixing a metal nanoparticle precursor with a perovskite oxide precursor; a step (step 2) of preparing a solid solution by annealing the mixture of the step 1; a step (step 3) of obtaining metal nanoparticle-perovskite oxide by heat-treating the solid solution of the step 2 in a reducing atmosphere; and a step (step 4) of obtaining the composite structure in which metal nanoparticle-perovskite oxide is bound to the metal oxide support by performing electrospinning and oxidative heat treatment of a mixture of the metal nanoparticle-perovskite oxide of the step 3 and a precursor of the metal oxide support. Specifically, the present invention relates to a method of using, as a gas sensing material, metal nanoparticle-perovskite oxide which is bound inside and on the surface of metal oxide nanofiber supports.

(Step 1)

The step 1 of the present invention is a step of mixing a metal nanoparticle precursor with a perovskite oxide precursor.

A method of mixing the metal nanoparticle precursor and the perovskite oxide precursor is not particularly limited. However, the method may be, for example, a method of mixing an aqueous solution of the metal nanoparticle precursor with an aqueous solution of the perovskite oxide precursor, followed by stirring.

The metal nanoparticle precursor may be one or more selected from the group consisting of cobalt (Co) salts, nickel (Ni) salts, and copper (Cu) salts. When a mixture of two or more kinds of metal nanoparticle precursors is used, an alloy, for example, CoNi metal nanoparticles, may be ex-solved on the final perovskite. In addition, metal nanoparticles may be ex-solved on the surface of perovskite oxide together with Fe of perovskite through a reductive heat treatment process. Through a subsequent preparation method, metal nanoparticles are formed from the metal nanoparticle precursor and ex-solved on the surface of the perovskite oxide. In other words, metal nanoparticles consisting of cobalt, nickel, copper, and iron may be ex-solved to exist on the surface of perovskite oxide.

Specifically, the metal nanoparticle precursor may be one or more selected from the group consisting of cobalt nitrate $(Co(NO_3)_2)$, nickel nitrate $(Ni(NO_3)_2)$, and copper nitrate $(Cu(NO_3)_2)$.

The precursor of the perovskite oxide may be a lanthanum (La) salt, a calcium (Ca) salt, or an iron (Fe) salt. Specifically, it may be lanthanum nitrate, calcium nitrate, or iron nitrate.

Further, the perovskite oxide may be a compound represented by the following Chemical Formula 3:

[Chemical Formula 3]

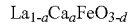

$La_{1-a}Ca_aFeO_{3-d}$ in Chemical Formula 3, a may be 0.1 to 0.9, and d may be 0 to 1.

Specifically, in Chemical Formula 3, a may be 0.3 to 0.5.

The metal nanoparticle precursor and the perovskite oxide precursor may be mixed at a molar ratio of 1:9 to 1:99. The corresponding mixing ratio may be controlled according to a composition of the metal nanoparticles to be introduced into the composite structure.

(Step 2)

The step 2 of the present invention is a step of preparing a solid solution by annealing the mixture of the step 1.

In the step 2, the mixture of the metal nanoparticle precursor and the perovskite oxide precursor may be sintered in an oxidation atmosphere, and as a result, metal nanoparticle precursors may be dissolved within the perovskite oxide lattice.

Annealing may be performed at a temperature of 600° C. to 1100° C. Specifically, the annealing of the step 2 may be performed at a temperature of 800° C. to 1000° C. When the annealing temperature is too low, there may be a problem in that the metal nanoparticle precursor is not completely dissolved, and when the annealing temperature is too high, there may be a problem of phase separation.

The step 2 may further include a step of finely milling the solid solution prepared by annealing (FIG. 1(a)). In this regard, there is no limitation to the fine milling method. However, for example, a high-energy ball milling method may be used. When the solid solution of the step 2 is finely milled, a specific surface area may be improved, which may result in an effect of increasing efficiency when used as a catalyst.

The step 2 may further include a step of finely milling the solid solution prepared by annealing (FIG. 1(a)).

(Step 3)

The step 3 of the present invention is a step of obtaining metal nanoparticle-perovskite oxide by heat-treating the solid solution of the step 2 in a reducing atmosphere.

Specifically, the step 3 may be a step of ex-solving metal nanoparticles on the surface of the perovskite oxide solid solution by growing in real-time using the "ex-solution" phenomenon. The ex-solution phenomenon through the reductive heat treatment is a spontaneous phase separation phenomenon. Since synthesis and dispersion of metal nanoparticles occur at the same time through a single heat treatment process in a reducing atmosphere, the process is simple and has cost/time advantages. In addition, uniformity, dispersibility, and ease of composition control of metal nanoparticles may be greatly improved, as compared with existing methods, because nanoparticles are ex-solved from the uniformly mixed solid solution to the surface and stabilized. In particular, by diversifying the type of metal cations dissolved in the perovskite support, the type and composition of the metal nanoparticles may be easily controlled to form a variety of single or heterogeneous metal nanoparticles.

In addition, since the metal nanoparticle precursor constituting the solid solution is easily reduced, as compared with perovskite oxide, there is a difference in reducibility. Therefore, it was confirmed that when the solid solution was heat-treated under a reducing atmosphere, the metal was reduced on the surface of perovskite oxide to be ex-solved in the form of nanoparticles.

In this regard, the size or distribution of the metal nanoparticles ex-solved to the surface of oxide may be controlled by controlling the heat treatment conditions in the reductive heat treatment step. The reductive heat treatment conditions include type and concentration of a reducing gas, heat treatment temperature, time, etc. In particular, with regard to the heat treatment temperature, the size of the metal nanoparticles to be ex-solved may vary depending on the temperature, as shown in FIG. 1(b). In addition, when examined using a scanning electron microscope (SEM), the metal nanoparticles ex-solved on the surface of perovskite oxide may be observed, as shown in FIG. 1(c).

The metal nanoparticles ex-solved by the reductive heat treatment step of the present invention may have a structural feature, in which about 30% thereof is partially impregnated into perovskite oxide. Accordingly, the metal nanoparticle catalysts are not easily separated from the supports, and thus catalyst stability may be improved.

Specifically, according to one embodiment of the present invention, in the step 3, any one or more of a $H_2$/Ar mixed gas, a $H_2$/$H_2O$ mixed gas, a CO/$CO_2$ mixed gas, and a $H_2$/$N_2$ mixed gas may be used. In addition, a volume ratio of the $H_2$/Ar mixed gas, $H_2$/$H_2O$ mixed gas, CO/$CO_2$ mixed gas, or $H_2$/$N_2$ mixed gas may be preferably 1/99 to 99/1. Specifically, the $H_2$/Ar mixed gas may be used in a volume ratio of 3/97 (v/v) to 5/95 (v/v). When the volume ratio of the mixed gas is less than 1/99, the reduction of metal particles may not occur well, and thus nanoparticles may not be formed. When the volume ratio is more than 99/1, uniformity or dispersibility of the metal nanoparticles may deteriorate due to excessive reduction.

Further, the step 3 may be performed at 200° C. to 1000° C. Preferably, the step 3 may be performed at 600° C. to 1000° C., specifically, 700° C. to 1000° C., 700° C. to 900° C., or 750° C. to 850° C. When the reductive heat treatment temperature of the step 3 is lower than the lower limit of the range, the reduction of metal particles may not occur well, and thus metal nanoparticles may not be formed on the surface of perovskite oxide. When the heat treatment temperature is higher than the upper limit of the range, dispersibility of the metal nanoparticles may deteriorate due to excessive reduction, and the structure of the composite structure may collapse.

Further, the heat treatment of the step 3 may be performed for 1 hour to 5 hours. Specifically, the heat treatment may be performed for 1 hour to 3 hours. When the heat treatment time is too short, the reduction of metal particles may not occur well, and thus there is a problem in that metal nanoparticles may not be easily formed on the surface of perovskite oxide. When the heat treatment time is too long, dispersibility of the metal nanoparticles may deteriorate due to excessive reduction, or the structure of the composite structure may collapse.

The metal nanoparticle-perovskite oxide prepared according to the step 3 may be a compound represented by the following Chemical Formula 1:

   [Chemical Formula 1]

X is one or more selected from the group consisting of Ni, Co, and Cu, in Chemical Formula 1, a is 0.1 to 0.9,
b is 0.01 to 0.1, and
d is 0 to 1.
Specifically, a may be 0.3 to 0.5, and
b may be 0.04 to 0.06.
Further, X which is a metal species of [Chemical Formula 1] may form metal nanoparticles ex-solved on the surface of perovskite oxide.
(Step 4)

The step 4 of the present invention is a step of obtaining the composite structure in which metal nanoparticle-perovskite oxide is bound to the metal oxide support by performing electrospinning and oxidative heat treatment of the mixture of the metal nanoparticle-perovskite oxide of the step 3 and a precursor of the metal oxide support (FIG. 1(d)).

A method of mixing the metal nanoparticle-perovskite oxide and the precursor of the metal oxide support is not particularly limited. However, the method may be a method of mixing an aqueous solution of the metal nanoparticle-perovskite oxide and an aqueous solution of the precursor of the metal oxide support. In this regard, an aqueous solution of a template structure may also be mixed together.

The metal oxide support of the present invention is not limited, as long as it is used in the field of gas sensors, for example, may be a compound represented by the following Chemical Formula 2:

   [Chemical Formula 2]

in Chemical Formula 2,
Y is W, Sn, Zn, Fe, or Ti,
e is 1 to 3, and
f is 1 to 4.

Further, the metal oxide support may be chloride of one or more metals selected from the group consisting of W, Sn, Zn, Fe, and Ti. Specifically, the metal oxide support may be $SnO_2$, and a precursor thereof may be $SnCl_2$.

As used herein, the template structure is a material that may be used to form a predetermined structure of a compound, and when the template structure is used, there is an advantage in that the structure of the metal nanoparticle-oxide support composite structure may be appropriately controlled. Particularly, in the present invention, the template structure may be used to produce the composite structure in the form of nanofibers, whereby the metal nanoparticle-perovskite oxide may be uniformly distributed on the metal oxide supports.

The template structure is a polymer, and may serve as a support to form a nanofiber structure during electrospinning. In addition, during a subsequent oxidative heat treatment process, the polymer template structure may be oxidized and pyrolyzed, and the metal oxide precursor may be oxidized to form a metal oxide nanofiber structure.

In the present invention, the polymer precursor for producing the template structure is not limited, as long as it is able to form a nanofiber shape by a method, such as electrospinning, etc., and may be pyrolyzed at a high temperature of the subsequent oxidative heat treatment process. For example, the polymer for producing the template structure may be one or more selected from the group consisting of polymethyl methacrylate (PMMA), polyvinyl pyrrolidone (PVP), polyvinyl acetate (PVAc), polyvinyl alcohol (PVA), polyacrylonitrile (PAN), polyethylene oxide (PEO), polypropylene oxide (PPO), a polyethylene oxide block copolymer (PEO BP), a polypropylene oxide block copolymer (PPO BCP), polyvinylchloride (PVC), polycarbonate (PC), polycaprolactone (PCL), and polyvinylidene fluoride (PVDF).

When nanofibers are obtained by electrospinning a solution, in which perovskite oxide having the metal nanoparticles ex-solved on the surface thereof, the precursor of the metal oxide support, and the polymer used as the template structure are dissolved, composite nanofibers are produced, in which the precursor of the metal oxide support is bound to the polymer nanofiber. In addition, metal nanoparticle-perovskite oxide is uniformly bound to the precursor of the metal oxide support.

Then, when the template structure is pyrolyzed through high-temperature oxidative heat treatment, the precursor of the metal oxide support is oxidized to form a metal oxide support in the form of a nanofiber, and the metal nanoparticle-perovskite oxide is bound inside or on the surface thereof to obtain a functionalized composite structure. That is, the metal oxide support is formed into a nanofiber shape according to the shape of the template structure, and then maintains the nanofiber shape even after the template structure disappears by pyrolysis.

The temperature during the high-temperature oxidative heat treatment may be 300° C. to 1000° C. Specifically, the high-temperature oxidative heat treatment temperature for pyrolysis of the template structure may be 400° C. to 600° C. When the high-temperature oxidative heat treatment temperature is too low, there may be a problem in that the template structure is not sufficiently pyrolyzed. When the temperature is too high, the crystal grains of the metal oxide support may excessively grow and the nanofiber structure may collapse, which may cause a problem.

In the composite structure of the present invention, prepared according to the above preparation method, metal nanoparticle-perovskite oxide is bound to metal oxide supports, and the metal nanoparticle-perovskite oxide may be in a form in which metal nanoparticles are ex-solved on the surface of the perovskite oxide.

The metal nanoparticle-perovskite oxide may be represented by the following Chemical Formula 1:

$$La_{1-a}Ca_aFe_{1-b}X_bO_{3-d} \quad \text{[Chemical Formula 1]}$$

X is one or more selected from the group consisting of Ni, Co, and Cu, in Chemical Formula 1, a is 0.1 to 0.9, and b is 0.01 to 0.1.

Specifically, a may be 0.3 to 0.5, and b may be 0.04 to 0.06.

Further, X which is a metal species of [Chemical Formula 1] may form metal nanoparticles ex-solved on the surface of perovskite oxide.

The metal oxide support may be a compound represented by the following Chemical Formula 2:

$$Y_eO_f \quad \text{[Chemical Formula 2]}$$

in Chemical Formula 2,
Y is W, Sn, Zn, Fe, or Ti,
e is 1 to 3, and
f is 1 to 4.

In the step 4 of the preparation method, the composite structure is obtained by performing electrospinning and oxidative heat treatment of the mixture of the metal nanoparticle-perovskite oxide and the precursor of the metal oxide support, and therefore, the metal oxide support may be in the form of a fiber, specifically, in the form of a nanofiber.

Further, the present invention provides a gas sensor including the metal nanoparticle-oxide support composite structure prepared according to the above-described preparation method. The type of gas detectable by the gas sensor of the present invention is not particularly limited. However, the gas may be, for example, $C_2H_6S$, $CH_3SH$, $H_2S$, $C_3H_6O$, CO, $NH_3$, $CH_4$, or a mixture thereof. In particular, the gas sensor has excellent detection selectivity and response to $C_2H_6S$.

The gas sensor of the present invention may be manufactured by dispersing the composite structure in a solvent and then applying it to a sensor substrate on which an electrode exists (FIG. 1(e)).

With regard to the gas sensor including the composite structure according to the present invention, a working temperature for gas detection may be 200° C. to 450° C. Specifically, the working temperature may be 300° C. to 375° C., or 325° C. to 375° C. Preferably, the working temperature may be 350° C.

Effect of the Invention

The present invention may provide a composite structure having improved durability, in which metal nanoparticles uniform in size are evenly distributed on the surface of perovskite oxide.

The present invention may also provide a high-performance gas sensor having excellent target gas detection performances by including the composite structure.

The present invention may secure the economic efficiency in manufacturing a gas sensor because metal species of precious metals are not used.

BRIEF DESCRIPTION OF DRAWINGS

FIG. 2(a) shows results of scanning electron microscopy (SEM) and FIGS. 2(b) to 2(d) show transmission electron microscopy (TEM) for observing the size and distribution of ex-solved metal nanoparticles according to the heat treatment temperature and the type of element according to Experimental Example of the present invention;

DETAILED DESCRIPTION OF THE EMBODIMENTS

Figure 1A:
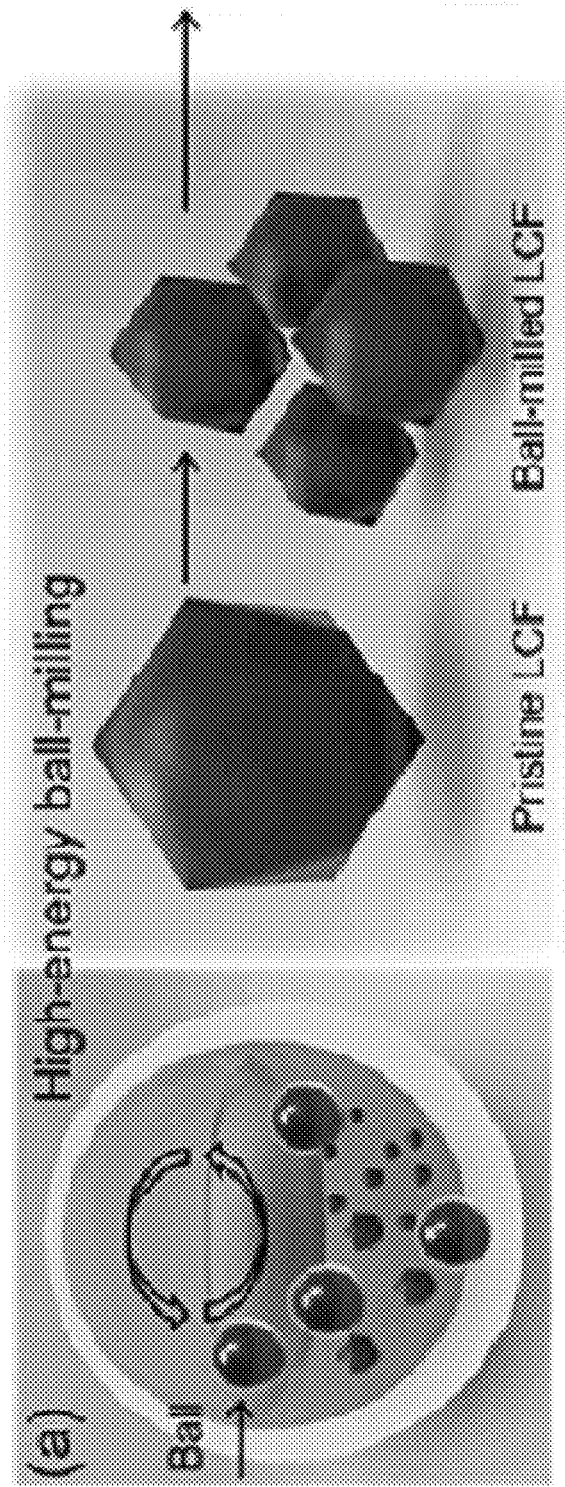
FIGS. 1(a) to 1(e) show schematic illustrations of a process of preparing a composite structure according to one embodiment of the present invention.
Figure 1B:
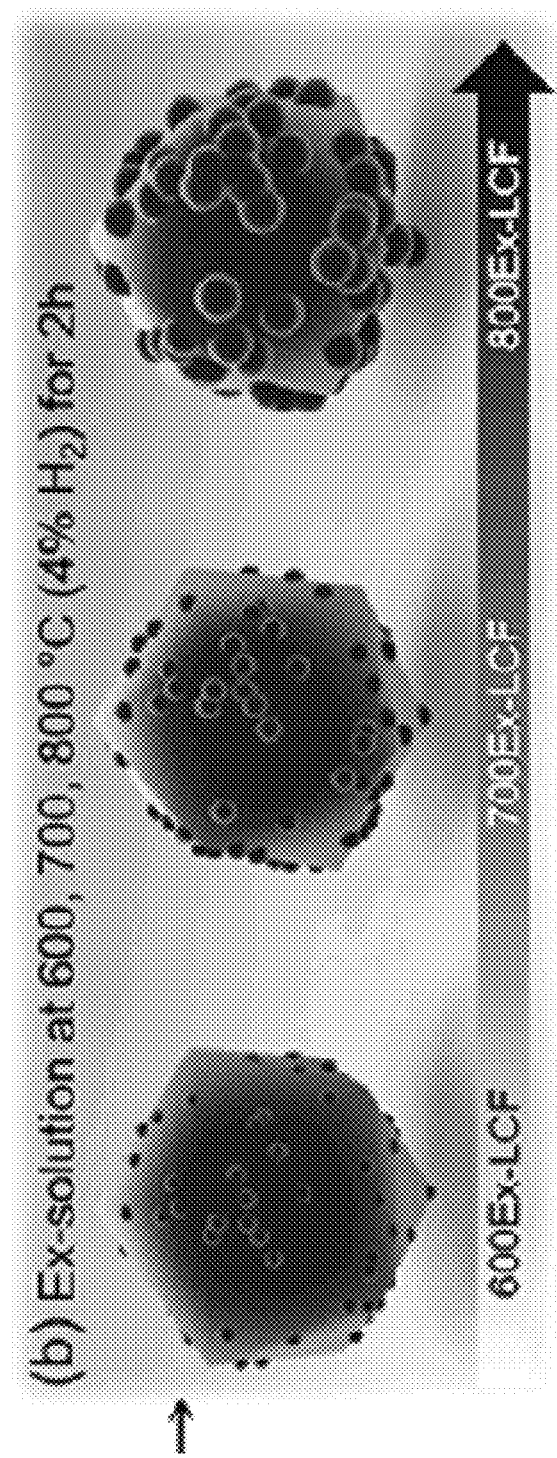
Figure 1C:
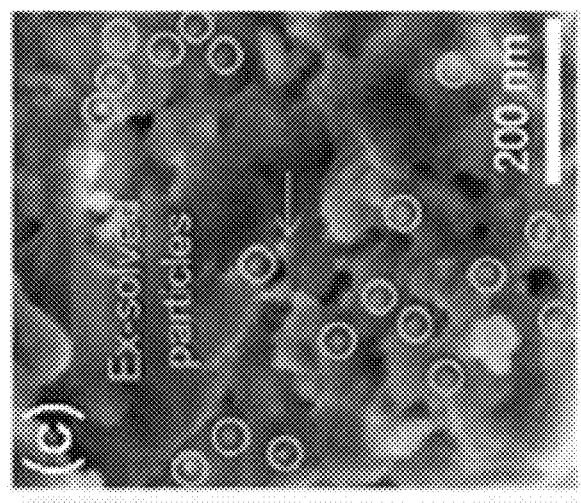
Figure 1D:
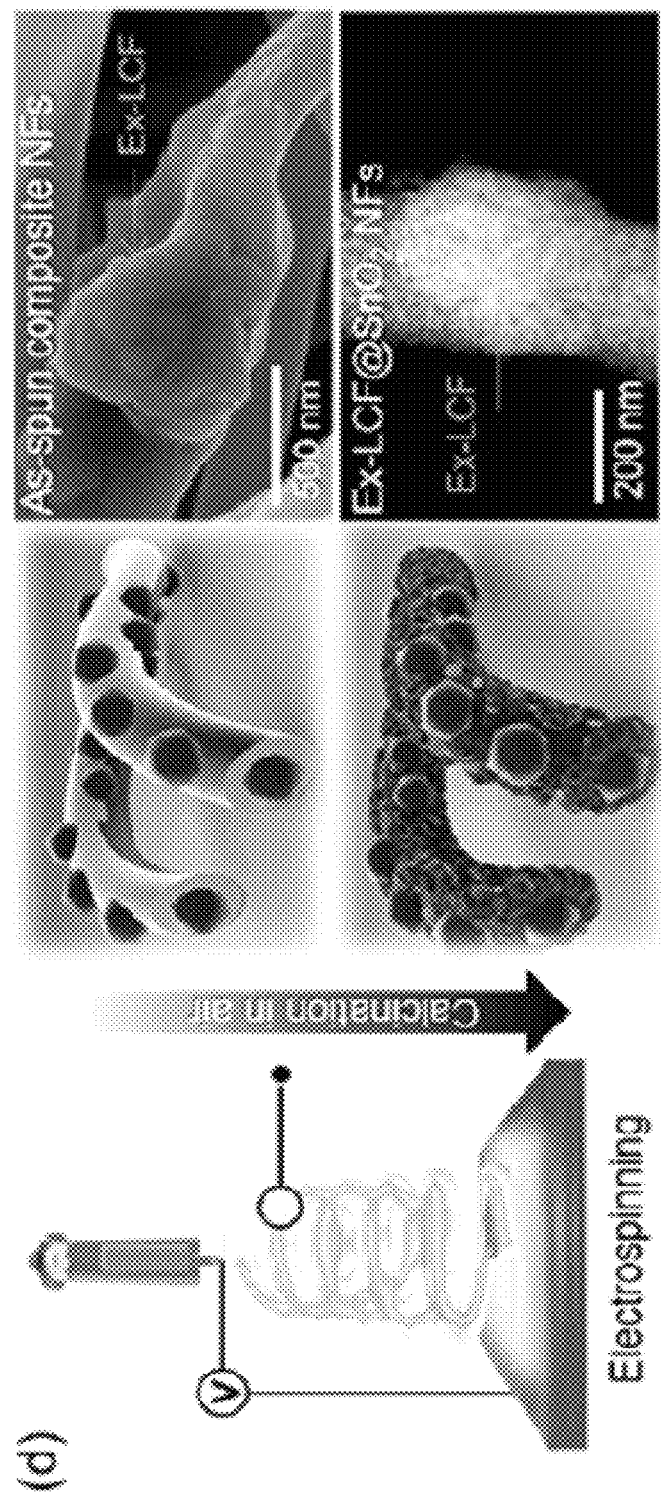
Figure 1E:
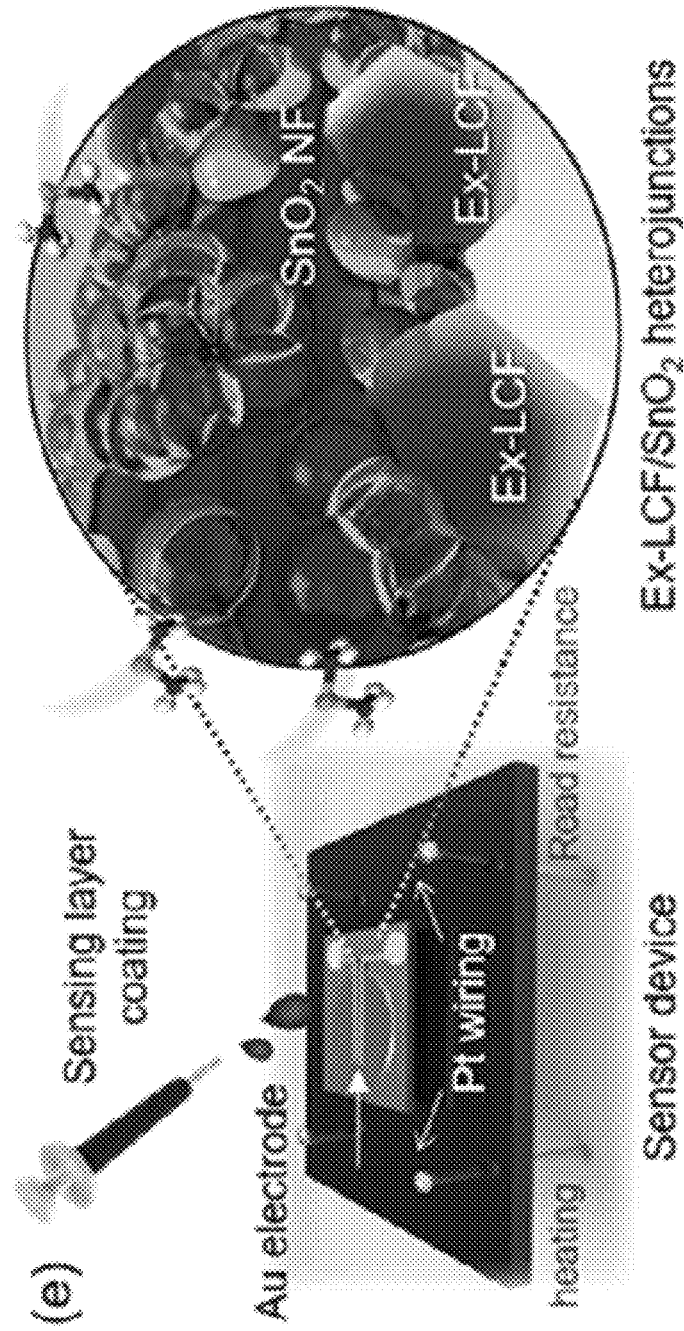

Hereinafter, the actions and effects of the present invention will be described in more detail with reference to the specific exemplary embodiments. However, these exemplary embodiments are only for illustrating the present invention, and the scope of the present invention is not limited thereto.

EXAMPLE

Example 1—Co-LCF Oxide

Cobalt nitrate $(Co(NO_3)_2)$ as a Co metal nanoparticle precursor, and lanthanum nitrate, calcium nitrate, and iron nitrate as a $La_{0.6}Ca_{0.4}FeO_3$ perovskite oxide precursor were mixed at a corresponding molar ratio, and sintered at a temperature of 900° C. to dissolve the Co metal in the perovskite oxide. The Co metal nanoparticle precursor and the perovskite oxide precursor were mixed at a molar ratio of 5:95 to allow 0.05 mol of Co to dissolve.

The perovskite oxide $La_{0.6}Ca_{0.4}Fe_{0.95}Co_{0.05}O_3$ particles, into which 0.05 mol of Co was dissolved, were finely milled by high-energy ball milling to increase a specific surface area thereof.

Thereafter, the transition metal dissolved inside the perovskite oxide lattice was allowed to ex-solve as metal nanoparticles on the surface of perovskite oxide by performing a reductive heat treatment step. The reductive heat treatment step was performed at 600° C., 700° C., and 800° C. for 2 hours under $H_2/Ar(4/96, (v/v))$ atmosphere to obtain Co-600Ex-LCF (Example 1-1), Co-700Ex-LCF (Example 1-2), and Co-800Ex-LCF (Example 1-3) oxide particles.

Example 2—Ni-LCF Oxide

Ni-600Ex-LCF (Example 2-1), Ni-700Ex-LCF (Example 2-2), and Ni-800Ex-LCF (Example 2-3) oxide particles were obtained in the same manner as in Example 1, except that nickel nitrate ($Ni(NO_3)_2$) as a Ni metal nanoparticle precursor was mixed with the perovskite oxide precursor at a molar ratio of 5:95 to allow 0.05 mol of Ni to dissolve, thereby preparing $La_{0.6}Ca_{0.4}Fe_{0.95}Ni_{0.05}O_3$, in Example 1.

Example 3—CoNi-LCF Oxide

CoNi-600Ex-LCF (Example 3-1), CoNi-700Ex-LCF (Example 3-2) and CoNi-800Ex-LCF (Example 3-3) oxide particles were obtained in the same manner as in Example 1, except that cobalt nitrate ($Co(NO_3)_2$) and nickel nitrate ($Ni(NO_3)_2$) as a CoNi metal nanoparticle precursor were mixed with the perovskite oxide precursor at a molar ratio of 2.5:2.5:95 to allow each 0.025 mol of Co and Ni to dissolve, thereby preparing $La_{0.6}Ca_{0.4}Fe_{0.95}Co_{0.025}Ni_{0.025}O_3$, in Example 1.

Comparative Example 1—$SnO_2$ Nanofiber

As Comparative Example 1, $SnO_2$ nanofibers, in which metal nanoparticle-perovskite oxide were not bound, were prepared.

Comparative Example 2—CoNi-Doped-LCF

As Comparative Example 2, perovskite oxide (CoNi-Doped-LCF) was prepared, in which CoNi metal nanoparticles were dissolved and remained inside the lattice because the oxidative heat treatment step for ex-solving the CoNi metal nanoparticles was not performed. The perovskite oxide was prepared in the same manner as in Example 3, except for the oxidative heat treatment step.

Experimental Example

In order to examine how the composite structures of Examples 1 to 3 and Comparative Examples 1 to 2 and performances (gas sensitivity and selectivity) during sensing reaction operating when used as a gas sensor were changed according to the reductive heat treatment process and conditions thereof, the following experiments were performed.

Experimental Example 1—Structure of Metal Nanoparticle-Perovskite Oxide

Perovskite oxide on which metal nanoparticles were ex-solved according to the reductive heat treatment temperatures of Examples 1 to 3 was examined by scanning electron microscopy (SEM) and transmission electron microscopy (TEM) (see FIGS. 2(a) to 2(d)).

Figure 2A:
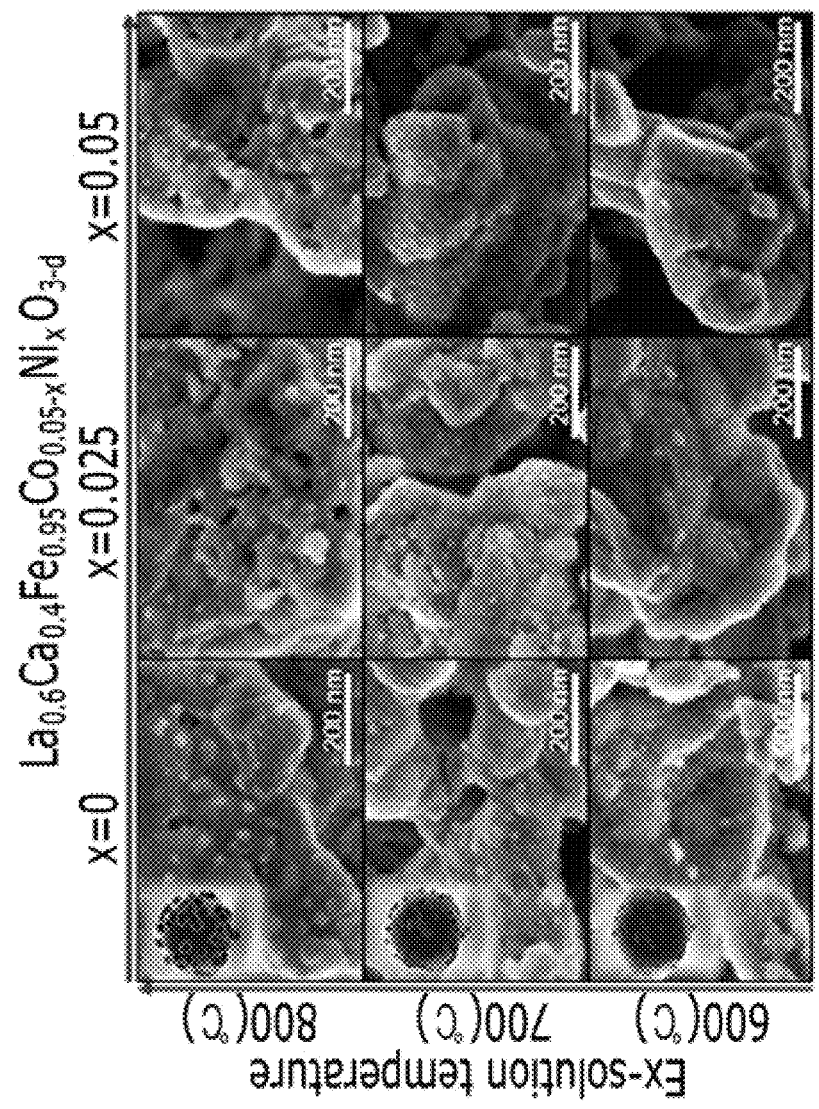

As a result of SEM image analysis, Example 1 showed that the size of the ex-solved Co nanoparticles increased to 11 nm, 20 nm, and 25 nm with increasing reductive heat treatment temperature (x=0 of FIG. 2(a)). In contrast, CoNi heterogeneous alloy nanoparticles showed that although the size of the ex-solved particles increased with increasing temperature, the size increased only to 7 nm, 14 nm, and 18 nm, which were smaller than the size of Example 1, in which Co was used alone (x=0.025 of FIG. 2(a)).

Figure 2C:
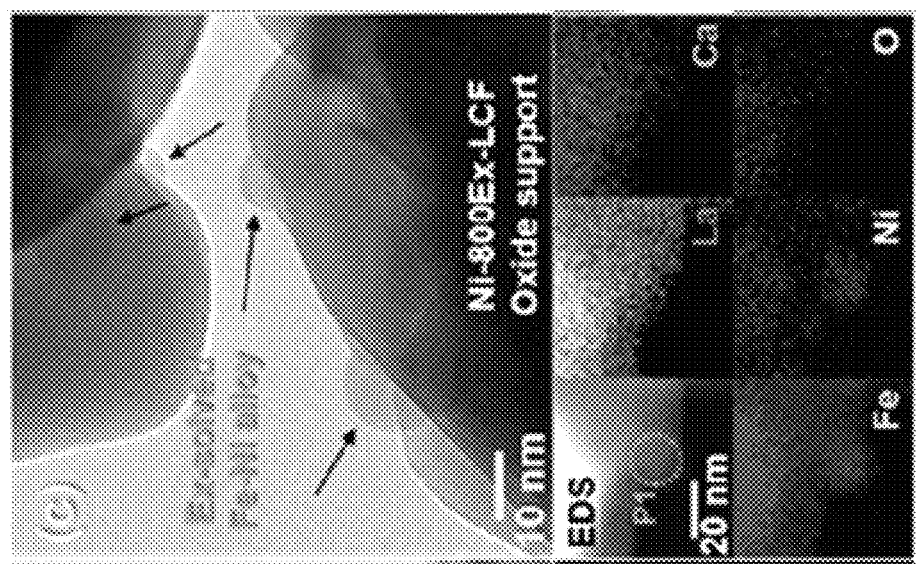
Figure 2D:
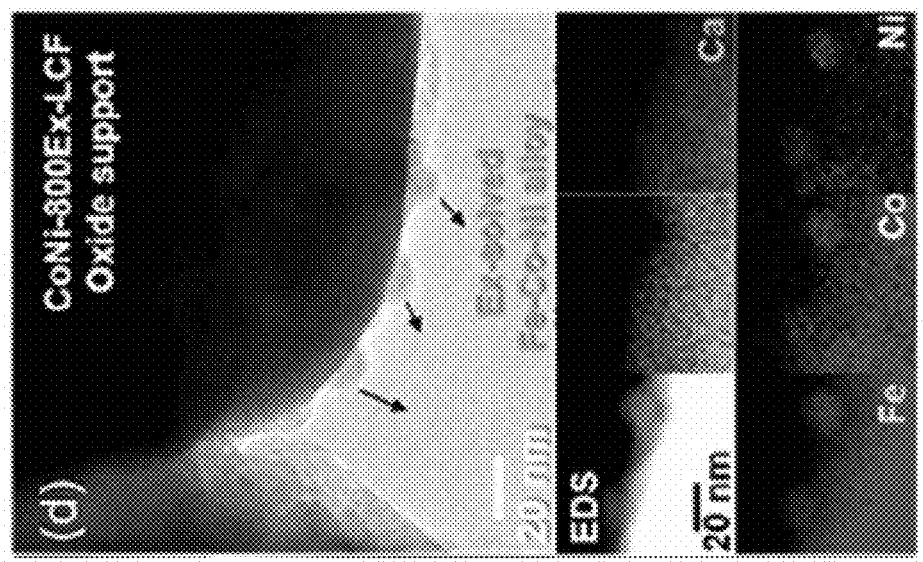

As a result of TEM analysis, when the reductive heat treatment, i.e., ex-solution was performed at 800° C., formation of Co, Ni, and CoNi alloy nanoparticles on the surface of perovskite oxide was observed (FIGS. 2(b), 2(c), and 2(d)). In particular, it was confirmed that Co, Ni, and CoNi were alloyed with Fe to form nanoparticles. These results indicate that the size, distribution, and composition of metal nanoparticles may be controlled by controlling the reductive heat treatment temperature and the type of dissolved metal element.

Experimental Example 2—Measurement of Sensitivity of Gas Sensor

A solution, in which the perovskite oxide of Example 1-3, Example 2-3, or Example 3-3, $SnCl_2$ as a precursor of a metal oxide support ($SnO_2$), and a poly(vinylpolypyrrolidone) polymer as a template structure were dissolved, was subjected to electrospinning, and then subjected to high-temperature oxidative heat treatment at 500° C. for 1 hour to decompose the polymer. The polymer forming the template structure was mixed in an amount of 100% by weight to 200% by weight with respect to the precursor of the metal oxide support.

As a result, each composite structure was obtained, in which metal nanoparticle-perovskite oxide was bound to the $SnO_2$ nanofiber ($SnO_2$ NFs) supports. The obtained composite structure was dispersed in ethanol, and then coated on an alumina sensor substrate (2.5 mm×2.5 mm) having a gold electrode (width=2.5 μm, gap size=150 μm) to manufacture a gas sensor.

The $SnO_2$ nanofiber (Pristine $SnO_2$ NFs) support of Comparative Example 1, in which perovskite oxide was not bound, was also dispersed in ethanol to manufacture a gas sensor in the same manner as Example 1-3.

A gas sensor was manufactured in the same manner as Example 1-3, except for using the perovskite oxide of Comparative Example 2, which was not subjected to the reductive heat treatment.

Thereafter, each gas sensor was stabilized in the humid air (80% RH; relative humidity), and then exposed to 1 ppm to 5 ppm of $C_2H_6S$ while turning on/off in units of 10 minutes to measure the sensing characteristics. The results are shown in FIG. 3(a).

Figure 3A:
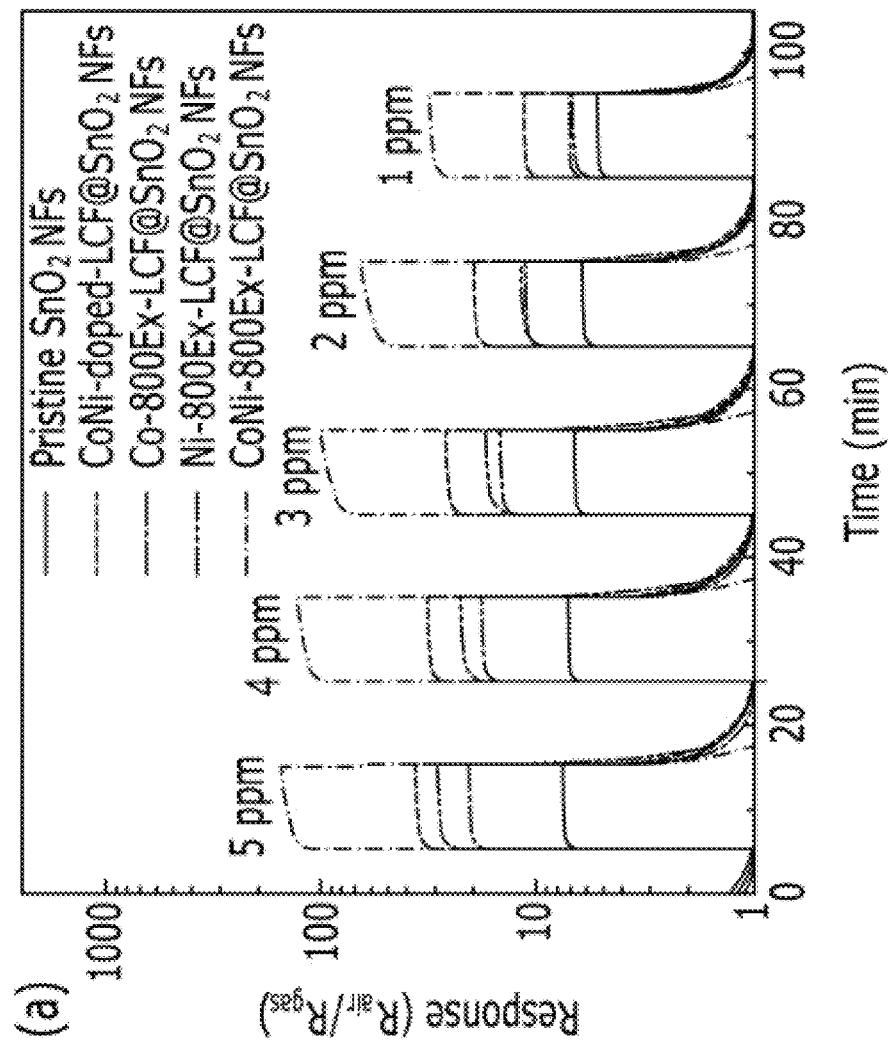
FIGS. 3(a) and 3(b) show results of measuring sensitivity of a gas sensor according to Experimental Example of the present invention.
Figure 3B:
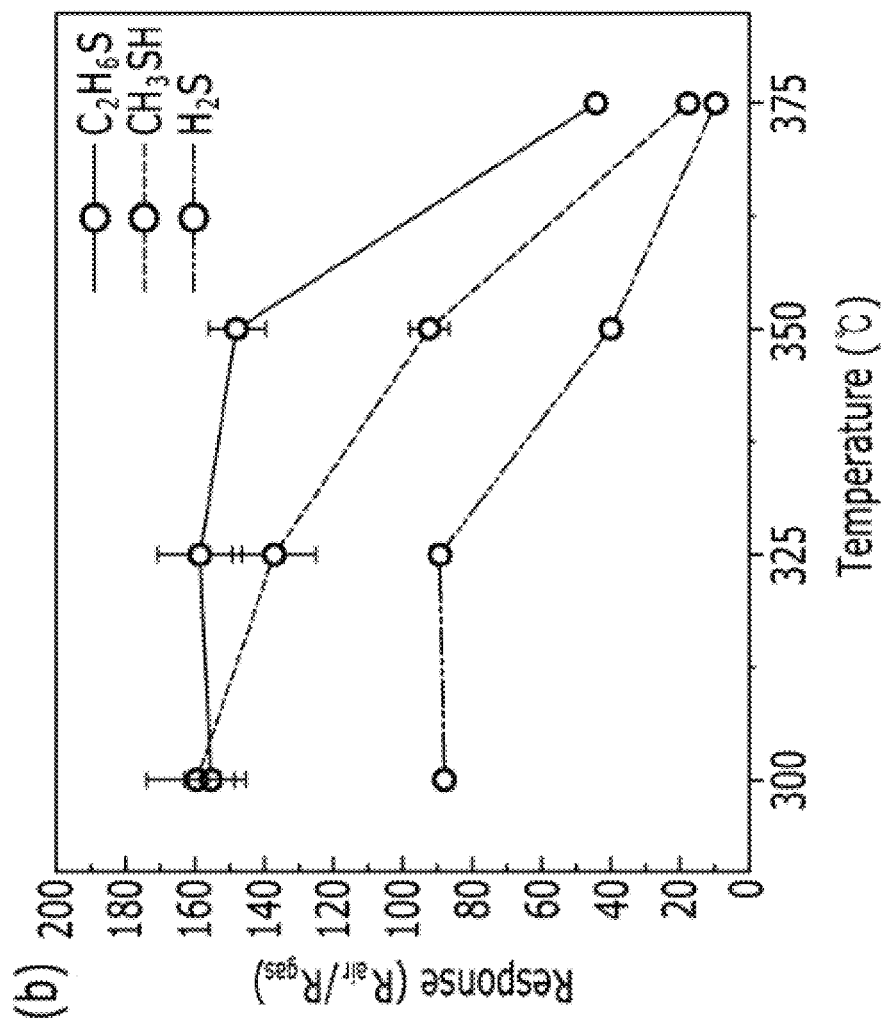

In FIGS. 3(a) and 3(b), Response represents gas sensing sensitivity and a value of ($R_{air}/R_{gas}$), $R_{air}$ represents a sensor resistance value in air, and $R_{gas}$ represents a gas resistance value when exposed to a target gas. Example 3-3, in which CoNi alloy as the metal nanoparticle was used, exhibited the sensitivity up to 160 at 5 ppm of $C_2H_6S$ gas, indicating the highest sensitivity.

The sensitivity was also measured by exposing to three representative sulfur compound gases, $C_2H_6S$, $CH_3SH$, and $H_2S$ while varying the temperatures of the gas sensor of Example 3-3 at 300° C. to 375° C., and the results are shown in FIG. 3(b).

As a result, the selective sensitivity to $C_2H_6S$ among the gases was excellent, and the selectivity was remarkable at 350° C., indicating the most optimized $C_2H_6S$ gas detection performance.

Experimental Example 3—Comparison of Sensitivity of Gas Sensors According to Reductive Heat Treatment It was examined how the gas sensing sensitivity was changed according to the reductive heat treatment to ex-solve metal nanoparticles.

Figure 4A:
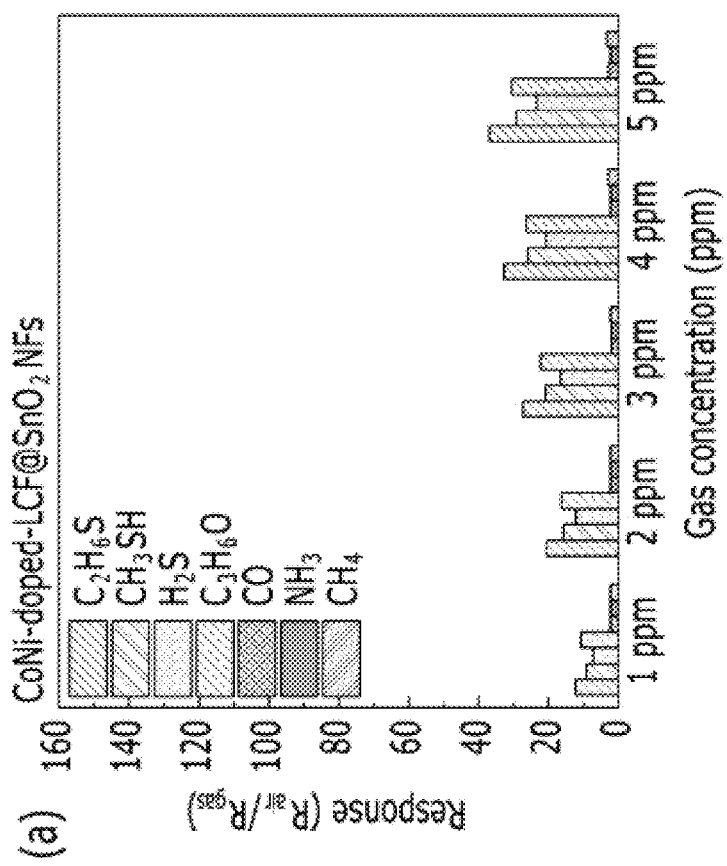
FIGS. 4(a) and 4(b) shows results of measuring the gas sensor according to heat treatment according to Experimental Example of the present invention.
Figure 4B:
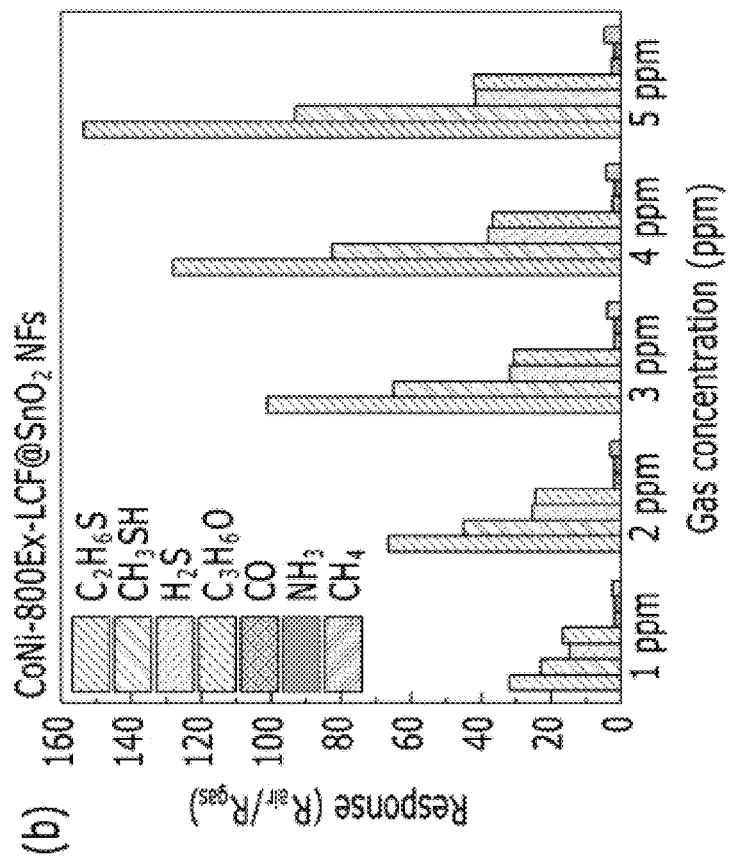

Sensitivity (Response) was measured using the gas sensors, in which Example 3-3 and Comparative Example 2 were applied respectively, and $C_2H_6S$, $CH_3SH$, $H_2S$, $C_3H_6O$, $CO$, $NH_3$, and $CH_4$ as target gases for sensing at different concentrations from 1 ppm to 5 ppm, and shown in FIGS. 4(a) and 4(b). A method of calculating sensitivity is the same as in Experimental Example 2.

Comparative Example 2 (CoNi-Doped-LCF @ SnO$_2$ NFs), in which the heat treatment process was not performed, showed a rare response to three gases of CO, NH$_3$, and CH$_4$, and similar sensitivity to four gases of C$_2$H$_6$S, CH$_3$SH, H$_2$S, and C$_3$H$_6$O, even though the type and gas concentration were different, indicating poor selectivity and response (FIG. 4(a)).

In contrast, Example 3-3 (CoNi-800Ex-LCF @ SnO$_2$ NFs) showed improved selective sensitivity to C$_2$H$_6$S and CH$_3$SH, and in particular, showed greatly improved sensitivity to C$_2$H$_6$S, indicating excellent selectivity and response (FIG. 4(b)).

Taken together, it was confirmed that when the reductive heat treatment step of ex-solving metal nanoparticles is included, the sensitivity for target gases may be improved and the selectivity may be also provided. It was also confirmed that gas selectivity may be changed by controlling the type and composition of metal nanoparticles.

The invention claimed is:

1. A composite structure, wherein metal nanoparticle-perovskite oxide is bound to metal oxide supports, and the metal nanoparticle-perovskite oxide has a form in which metal nanoparticles are ex-solved on the surface of the perovskite oxide, wherein the metal nanoparticle-perovskite oxide is represented by the following Chemical Formula 1:

$$La_{1-a}Ca_aFe_{1-b}X_bO_{3-d}$$ [Chemical Formula 1]

X is one or more selected from the group consisting of Ni, Co, and Cu, in Chemical Formula 1, a is 0.1 to 0.9, b is 0.01 to 0.1, and d is 0 to 1.

2. The composite structure of claim 1, wherein the metal oxide support is a compound represented by the following Chemical Formula 2:

$$Y_eO_f$$ [Chemical Formula 2]

in Chemical Formula 2,

Y is W, Sn, Zn, Fe, or Ti, e is 1 to 3, and f is 1 to 4.

3. The composite structure of claim 1, wherein the metal oxide support is in the form of nanofiber.

* * * * *